United States Patent [19]

Eguchi et al.

[11] 4,316,941

[45] Feb. 23, 1982

[54] RUBBER STOPPER FOR SEALING

[75] Inventors: Tsukasa Eguchi, Tokyo; Mituharu Morozumi, Yokohama, both of Japan

[73] Assignees: Asahi Glass Company Ltd., Tokyo; Kashima Kagaku, Co., Ibaraki, both of Japan

[21] Appl. No.: 190,957

[22] Filed: Sep. 26, 1980

[30] Foreign Application Priority Data

Oct. 2, 1979 [JP] Japan .............................. 54-126389

[51] Int. Cl.³ .................... B32B 27/30; B65D 39/00
[52] U.S. Cl. ................................ 428/421; 215/364; 220/307; 220/DIG. 19; 428/422; 428/447; 428/492; 428/521
[58] Field of Search ............... 428/492, 422, 421, 447, 428/517, 521; 215/364, 365; 220/307, DIG. 19

[56] References Cited

U.S. PATENT DOCUMENTS

| 3,578,037 | 5/1971 | Flynn | 215/364 |
| 3,628,681 | 12/1971 | Schwartz | 215/364 |
| 4,151,342 | 4/1979 | Uchino | 428/500 |

FOREIGN PATENT DOCUMENTS

WO 80/001060 5/1980 PCT Int'l Appl. .

*Primary Examiner*—Ellis P. Robinson
*Attorney, Agent, or Firm*—Oblon, Fisher, Spivak, McClelland & Maier

[57] ABSTRACT

A rubber stopper for sealing comprises a substrate of a rubber stopper which is partially or wholly coated with a fluorine-containing elastomer comprising a graft copolymer having rubber-like elasticity and having chemical linkages of fluorine-containing polymeric segments and organopolysiloxane segments at reactive sites of said segments.

11 Claims, No Drawings

RUBBER STOPPER FOR SEALING

BACKGROUND OF THE INVENTION

1. Field of the Invention

The present invention relates to a rubber stopper for sealing. More particularly, it relates to a rubber stopper which is partially or wholly coated by a cured coating layer of a specific fluorine-containing elastomer.

2. Description of the Prior Arts

Recently, it has been discussed on impurities adhered on a rubber stopper for sealing especially a rubber stopper for pharmaceutical application such as for sealing an injection. The impurities may be certain impurities remained on the rubber stopper after washing it or certain impurities formed by contacting the rubber stopper with a chemical solution, which are formed by various phenomena. According to a scanning electron microscope observation of the surface of the rubber stopper after washing, at a magnification of about $10^2$ to $10^3$ times, concave portions and adhesion of solid impurities are found. They may cause to increase impurities in ageing. In the rubber, a curing accelerator, carbon black, zinc oxide, titanium oxide and sulfur are incorporated. During the sterilization of the rubber stopper or the contact with a chemical solution, it is difficult to prevent the migration of the additive or the filler on the surface of the rubber stopper or dissolution of the additive or the filler.

When the sterilization with hot water or steam or ethylene oxide gas is performed after equipment of the rubber stopper on a bottle for an injection, such impurities may not be eliminated even though the virus and bacterium (hereinafter virus) can be eliminated.

The rubber for the rubber stopper usually has high friction coefficient to cause difficulty for removing virus and impurities adhered on the surface of the rubber stopper. The rubber stoppers having the tacky surface are mutually adhered each other whereby it is difficult to prevent a trouble caused in the stopper closing operation or the sterilization. During the transportation and storage of the rubber stoppers, the tacky adhesion problem causes a trouble.

Chlorinated butyl rubber used for a rubber stoppers of a vial bottle is a chlorinated product of butyl rubber obtained by copolymerizing isobutylene as a major component with isoprene as a minor component whereby there is possibility to cause chemical reaction on the surface of the rubber stopper in the sterilization with ethylene-oxide. It has been proposed to coat the surface of the rubber stopper with various synthetic resin coatings or cured synthetic rubber coatings in order to overcome various disadvantages for the rubber stopper for sealing especially rubber stopper for pharmaceutical application such as for sealing an injection. The synthetic resin coating is formed by laminating a synthetic resin film on the surface of the rubber stopper coated with the binder or forming a synthetic resin film in one piece on the surface of the rubber stopper. Such process usually requires complicated operations or sometimes is not applicable depending upon the configuration of the rubber stopper. The adhesion strength is not high enough whereby it may be peeled off during the use. Moreover, the synthetic resin coating sometimes may diminish the function of the rubber stopper for sealing. As the cured synthetic rubber coating layer, a cured fluorinated rubber coating having excellent chemical resistance and heat resistance can be considered. The adhesion characteristic to various substrates is not satisfactory.

According to various studies, a coating of cured rubber having self-adhesion property of a copolymer of propylene, tetrafluoroethylene and glycidyl vinyl ether is chemically stable in various sterilization of the rubber stopper to satisfy certain requirements, however, the contamination of the impurities caused by leaching or dissolving the impurities can not be prevented.

Various studies have been made under the consideration of such problems. As a result, the following surprizing fact has been found. The graft copolymer obtained by a chemical reaction of reaction sites of both the segments of a polymer having epoxide group obtained by a copolymerization of glycidyl vinyl ether as the fluorine-containing polymeric segments and a polymer obtained by a copolymerization of a siloxane having amino group as the organopolysiloxane segments, is a fluorine-containing elastomer having excellent heat resistance, chemical resistance and freezing resistance and can be formed as a cured coating layer having excellent properties on the surface of the rubber stopper and can substantially prevent contamination of the impurities.

The specific cured coating layer has lubricating property to prevent the trouble of tacky adhesion.

SUMMARY OF THE INVENTION

It is an object of the present invention to provide a rubber stopper for sealing which has a cured fluorine-containing elastomer coating layer having excellent heat resistance, chemical resistance and freezing resistance and lubricating property to prevent contamination of impurities.

The foregoing and other objects of the present invention have been attained by providing a rubber stopper for sealing which comprises a substrate of a rubber stopper which is partially or wholly coated with a fluorine-containing elastomer comprising a graft copolymer having rubber-like elasticity and having chemical linkages of fluorine-containing polymeric segments and organopolysiloxane segments at reactive sites of said segments.

DETAILED DESCRIPTION OF THE PREFERRED EMBODIMENTS

It is important to form a coating layer of a cured specific fluorine-containing elastomer on the surface of the rubber stopper. Such cured elastomer coating layer has excellent characteristics of lubrication and nontackiness whereby it provides a rubber stopper for sealing which prevents adhesion of virus or impurities and has not disadvantages of mutual tacky adhesion in closing operation, transportation and storage. It also provides a rubber stopper for sealing which is coated with a cured elastomer coating layer which is chemically and physically stable in various sterilizations. Moreover, in the optimum embodiment of the present invention, the cured elastomer coating layer can be formed by heat-curing in the absence of any vulcanization accelerator. The dissolution of impurities from the body of the rubber stopper can be prevented and the dissolution of impurities from the cured elastomer coating layer can be also decreased.

In the present invention, the fluorine-containing polymeric segments comprises at least one kind of polymerized fluorinated olefin parts, preferably, the elastic copolymer of two or more different monomeric units having reactive sites A. More specifically, the aforementioned segment can be selected from tetrafluoroethylene-propylene copolymer; tetrafluoroethylene perfluoroalkylperfluorovinyl ether copolymer; vinylidene fluoride-hexafluoropropylene copolymer; and vinylidene fluoride-pentafluoropropylene copolymer; furthermore, vinylidene fluoride-trifluoroethylene copolymer; tetrafluoroethylene-ethylene-isobutylene copolymer; ethylene-hexafluoropropylene copolymer; tetrafluoroethylene-buthene-1 copolymer; tetrafluoroethylene-ethylvinyl ether copolymer; tetrafluoroethylene-CF₃NO copolymer; and vinylidene fluoride-perfluoroalkylperfluorovinyl ether copolymer.

The ratio of the monomeric units can be in a wide range as far as the resulting copolymers are elastic, such as for example, the copolymer of 40–70 mol % of tetrafluoroethylene and 60–30 mol % of propylene; the copolymer of 50–90 mol % of vinylidene fluoride, 10–50 mol % of hexafluoropropylene and 0–30 mol % of tetrafluoroethylene; the copolymer of 30–90 mol % of tetrafluoroethylene and 70–10 mol % perfluoroalkylperfluorovinyl ether; and the copolymer of 50–90 mol % vinylidene fluoride and 10–50 mol % pentafluoropropylene and others.

It is also possible that the said fluorine-containing polymeric segments contain the major chain with reactive sites, together with other monomeric units in appropriate amounts.

For example, the tetrafluoroethylene/propylene copolymer can incorporate a desired other unit such as vinylidene fluoride, ethylene, isobutylene, acrylic acid, acrylic acid esters, methacrylic acid, methacrylic acid esters, hexafluoropropylene, trifluorochloroethylene, chloroethyl vinyl ether and perfluoroalkyl vinyl ether.

The present organopolysiloxane segments can be selected from the well known or available organopolysiloxanes but of course not limited thereto. A wide variety of organopolysiloxanes, such as homopolymers or copolymers comprising components of dimethylsiloxane or methylphenyl siloxane or trifluoropropyl siloxane having reactive sites B therein.

In the present invention, the aforementioned reactive sites A and B result chemical reaction to form the grafting sites to link chemically the fluorine-containing polymeric segments and the organopolysiloxane segments forming the graft copolymers. Such reactive sites can be illustrated by the following examples:

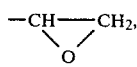

—CH₂CH₂Cl, —CH₂NHR (R represent hydrogen atom or alkyl group) —CH₂COOH,

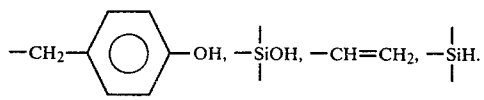

These reactive sites result chemical reactions according to the following scheme:

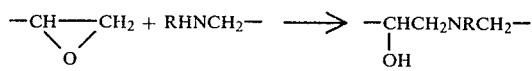

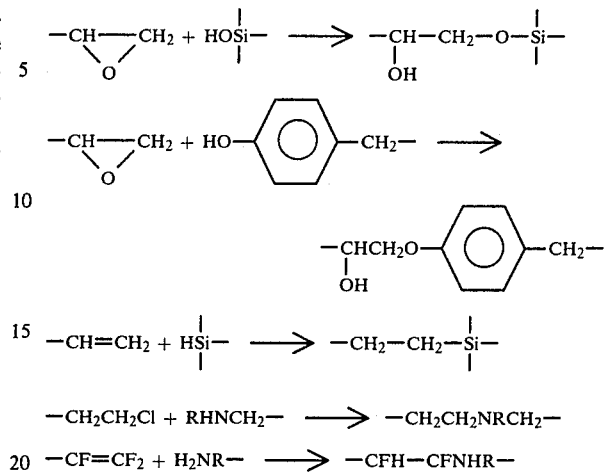

The combination of a polymer having epoxide group as the fluorine-containing polymeric segments and a polymer having the amino group or carboxylic group as the organopolysiloxane segments which have the reactive sites are desirable, and of course, the alternative combination of a polymer having the amino or carboxylic group as the fluorine-containing polymeric segments and a polymer having the epoxide group as the organopolysiloxane segments are also possibly used. The reactive groups can be selected by careful consideration of the reactivity of the sites to be grafted, easiness for production of the segments having the reactive site, the stability of the formed grafted linkages etc.

The polymeric segments having reactive sites may be prepared by various means, but can smoothly, effectively be prepared by copolymerization of the aforementioned main chain monomer unit and the monomer unit of reactive site, that is the fluorine-containing polymeric segments having the reactive site A can be obtained by copolymerization of a main monomer such as a fluorinated olefin and the monomer having reactive site A, and the organopolysiloxane segments having reactive site B can be prepared by the copolymerization of the organosiloxane having reactive site B and the main chain component monomer, such as, for example, dimethylsiloxane. The monomer having reactive site A can be glycidyl vinyl ether, acrylic acid, methacrylic acid, 2-chloroethylvinyl ether, glycidyl acrylate. The monomer having reactive site B can be selected from the group of organosiloxanes, such as illustrated below:

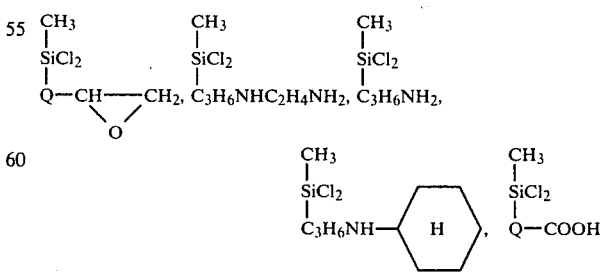

The present fluorine-containing elastomers are the graft copolymers having rubber-like elasticity, comprising the fluorine-containing polymeric segments and the organopolysiloxane segments which are chemically linked through the reactive sites A and B.

The average degree of polymerization of said segments may vary within a wide range, but generally 50-10,000 for the fluorine-containing polymeric segments, and about 50-50,000 for the organopolysiloxane segments.

The fluorine-containing polymeric segments can be formed as main chain, while the organopolysiloxane segments are formed as branch, or, of course, vice-versa, or even in a mixed mode thereof, for example, the combination of the fluorine-containing polymeric segments having a number average degree of polymerization of more than 100 and the organopolysiloxane segments having a number average degree of polymerization of less than 3,000, or the combination of the fluorine-containing polymeric segments having a number average degree of polymerization of less than 1,000, and the organopolysiloxane segments having a number average degree of polymerization of more than 3,000. Preferably, the number average degree of polymerization of the fluorine-containing polymeric segments is in a range of about 100-5,000, and that of organopolysiloxane segments is in a range of about 100-30,000.

The ratio between the number of branches to one main chain in the graft copolymer is in a range of about 1/50,000-1/10, preferably, 1/30,000-1/100.

According to the present invention, the branch segments can be prepared during the course of graft copolymerization, for example, the organopolysiloxane segments comprising vinyl group as reactive site are used as the trunk polymer, and then the fluorinated olefin is grafted on the trunk polymer to form fluorine-containing polymeric segments as the branch chain. However, it is more easily prepared when the said main chain polymeric segments and branch polymeric segments are separately prepared, and then chemically linked through the reactive sites A and B. Because the possible gel formation can easily be controlled.

The polymeric segments having reactive sites can be selected from the aforementioned group, and the molar ratio of reactive sites to each segment may vary within a wide range, generally, within 0.01-20 mol %, preferably 0.1-5 mol %. If the concentration of reactive site is too low, the graft copolymerization cannot smoothly performed and if it is too high, the cross-linking reaction causes preferentially to form excessive three dimensional network, resulting in an undesired product which fails to give any rubber-like elastomer of excellent properties. Therefore, the said ratio must be selected depending upon the average degree of polymerization, reactive site properties and monomeric unit constituting the polymeric segments, and the molar ratio of the fluorine-containing polymeric segments to the organopolysiloxane segments, all of which depend on the required properties and/or purpose of the graft copolymer to be obtained.

In the present invention, the ratio of the fluorine-containing polymeric segments to the organopolysiloxane segments in the said graft copolymers can also vary within a wide range, depending on the average degrees of polymerization of the said segments, the required properties and purpose of the graft copolymers, and further which part of the said segments is selected for the main chain of the copolymer to be prepared. Generally, the ratio can be selected within about 1-2,000 parts by weight of the organopolysiloxane segments, preferably, about 5-1,000 parts by weight, per 100 parts by weight of the fluorine-containing polymeric segments.

The graft copolymerization between the aforementioned segments through reactive sites is most preferred embodiment to obtain the fluorine-containing elastomers and can be carried out by various means and condition for the reaction. It is also preferred to promote the graft copolymerization in organic solvent wherein the two segments are ensured to be mixed homogeneously, that is, after both the segments are completely dissolved in good solvent, the graft copolymerization is carried out, in view of the smooth and effective reaction and the uniform reaction. Such organic solvent can be fluorochlorohydrocarbons, esters, ketones and cyclic ethers such as trifluorotrichloroethane, trichloroethylene, ethyl acetate, acetone, methyl ethyl ketone, tetrahydrofuran and dioxane.

The reaction temperature can also vary depending on the combination of the reactive sites incorporated in the segments. In the case of the combination of epoxide group and amino group, the temperature can be room temperature or a refluxing temperature of the solvent, or even it is possible to proceed the reaction in the condition that the solvent is being evaporated.

The reaction time may not be specified, and depending on the reaction temperature, it may be set between 10 minutes and several hours. It is possible to perform the reaction under the condition of homogeneous solution and then to react the unreacted portion of reactants by heating or drying during the solvent evaporation. It is also possible to remove the unreacted portion of the polymeric segments by a desired solvent extraction, for example, carbon tetrachloride or n-hexane which extracts only the siloxane segments, can be used.

In the formation of a cured fluorine-containing elastomer coating layer, various curing means can be employed. In order to improve the efficiency for curing the elastomers effectively, it is preferable to give curing sites in the graft copolymer. Such curing sites can be incorporated into either the fluorine-containing polymeric segments or the organopolysiloxane segments, or even both the segments by the same methods as specified for the incorporation of the aforementioned reactive sites. The compound having the curing site can be copolymerized with the monomer having reactive site A or that of B. The curing sites may be or may not be the same chemical species as that of reactive sites; in case that the same functional group is employed for the curing site, any one of the reactive sites combination capable to form the graft linkage must be in excess amount, so that the unreactive sites can be used as the curing sites.

Depending on the chemical species for the curing site, the present fluorine-containing polymeric elastomers may be classified as peroxide-curable type, amine-curable type and so forth.

The curing sites for the fluorine-containing polymeric segments can be selected from the group as illustrated below; glycidylvinyl ether, glycidylacrylate, chloroethylvinyl ether, acrylic acid, methacrylic acid, bromotrifluoroethylene, $CF_2=CF-OCF_2CF=CF_2$ vinylidene fluoride, $CH_2=CHO-CF_2CF=CF_2$, hydroxyethylvinyl ether. The curing sites for the organopolysiloxane segment can be

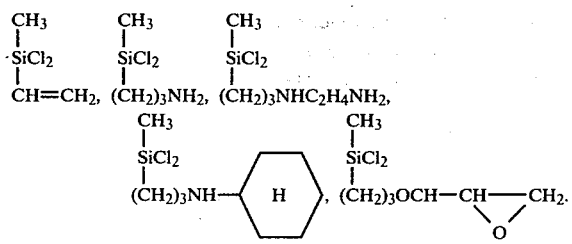

The ratio of the amount of curing sites to that of graft copolymer is in a range of about 0.1 to 5 mol % based on graft copolymer.

When glycidyl vinyl ether is used as units for curing, the curing characteristics of the specific fluorine-containing elastomer is excellent whereby various cross-linking processes such as chemical crosslinking processes using an organic peroxide or an amine or radiation crosslinking processes such as radiation of ionized radiation of γ-rays or electron rays can be employed. In the case of a curable composition using the specific curing accelerator, it is possible to perform the curing at a relatively low temperature such as about room temperature.

The specific curing accelerators include tertiary amines, salts thereof and combinations of a tertiary amine and a hydroxy compound.

Suitable tertiary amines include benzyldimethylamine, α-methylbenzyl dimethylamine, dimethylaminomethyl phenol, tris(dimethylaminomethyl)-phenol, diethylaminopropylamine, N-aminoethylpiperazine, methylimidazole, triethylenediamine, N,N'-bisalkylpiperazine, 4,4'-trimethylenedipyridine, N-ethylmorpholine, 1,8-diazabicyclo(5,4,0)undecene-7 and hydroacid salts thereof.

Suitable hydroxy compounds used in the combination with the tertiary amine include octanol, cyclohexanol, phenol, ethyleneglycol, propyleneglycol, polyethyleneglycol, polypropyleneglycol, hydroquinone, catechol, resorcinol, 2,2'-bis(4-hydroxyphenyl) propane (Bisphenol A), 1,3,5-trihydroxybenzene, dihydroxynaphthalene, 4,4'-dihydroxydiphenyl, 4,4'-dihydroxystilbene, 2,2'-bis(4-hydroxyphenyl) butane (Bisphenol D), 2,4-dihydroxybenzophenone, 2,4-dihydroxybenzoic acid, 4,4'-dihydroxydiphenylsulfone, 2-methylresorcinol, trimethylol alkyloxyphenol and tris(4-hydroxyphenyl) methane.

Although chemical stability of crosslinkages is slightly inferior to these of the application of said curing accelerator, aromatic polyamines such as xylenediamine, methaphenylenediamine, diaminodiphenylmethane and diaminodiphenylsulfone; and alicyclic or heterocyclic polyamine such as methanediamine and bisaminopropyltetraoxaspiroundecene, can be also used as curing accelerators crosslinkable at room temperature.

The curing accelerator is used at a ratio of about 0.1 to 10 wt. parts per 100 wt. parts of the specific fluorine-containing elastomer. The curing is performed at a temperature from room temperature to about 250° C. The typical compositions which are curable at room temperature are as follows.

| | |
|---|---|
| Specific fluorine-containing elastomer: | 100 wt. parts |
| MT-carbon black: | 0 to 60 wt. parts |
| Hydroquinone: | 0.2 to 2 wt. parts |
| -continued | |
| Tris(dimethylaminomethyl) phenol: | 0.2 to 2 wt. parts |

The curable composition is kneaded in a mixing roll mill or an open roll mill etc. and is fabricated in a sheet having a thickness of about 0.5 to 1 mm and is cut in a suitable size and dissolved in a solvent to obtain a solution. The solvent such as ethyl acetate, tetrahydrofuran and 1,1,2-trichlorotrifluoroethane is used at a ratio of more than 150 weight parts, preferably 150 to 230 wt. parts per 100 wt. parts of the curable composition. It is possible to incorporate a viscosity regulator such as butyl acetate and isoamyl acetate into the solvent. The mixed solvent of ethyl acetate and butyl acetate can be at a ratio of 100:100 to 200:100. The solution of the curable composition is preferably adjusted before application to have a concentration of the polymer of less than about 20 wt.% preferably about 10 to 0.5 wt.% and a viscosity of less than about 1,000 cp preferably 250 to 100 cp at 25° C. When the solution is coated on a part of the surface of the rubber stopper, it is coated by a brush or a spray coating method. When it is coated on whole of the surface, it is preferably coated by a dipping method. The amount of the coated solution is usually to give a thickness of the cured coating layer of about 1 to 100μ preferably about 2 to 10μ though it can be less than 1μ. The curable composition can be coated by a powder coating method instead of the use of the solution.

The heat-curing of the curable composition comprising a curing accelerator is usually performed at about 80° to 250° C. The typical curable composition can be cured at room temperature, for example, a cured coating layer which is firmly bonded on the surface of the rubber stopper can be formed only by keeping the coated one at room temperature for about 3 to 14 days.

The curing of the fluorine-containing elastomer having glycidylvinyl ether component as the curing units can be performed by heating at about 130° to 200° C. preferably about 140° to 160° C. for about 5 to 30 minutes preferably about 10 to 20 minutes without any curing accelerator. When the rubber stopper is used for the pharmaceutical application such as the sealing of an injection, a side-effect caused by the presence of the curing accelerator may be considered, however, such trouble can be prevented by said heat-curing whereby hygiene and safety for handling of medicines can be maintained. The coating of the curable composition on the surface of the rubber stopper can be performed by the same manner as the curing of the curable composition containing the curing accelerator.

In the curable composition of the fluorine-containing elastomer with or without the curing accelerator, it is possible to incorporate various additives such as metal oxides such as magnesium oxide and zinc oxide; reinforcing agents such as carbon black and fine silica; a filler; a pigment; an antioxidant and a stabilizer, if necessary. It is also possible to incorporate the other synthetic or natural rubber or a synthetic resin at a ratio that the characteristics of the fluorine-containing elastomer are not deteriorated. The components of the curable compositions can be mixed by the conventional mills such as rubber kneader, roll mill and Banbury mixer.

In accordance with the present invention, the adhesion strength of the cured coating layer which is partially or wholly coated on the surface of the rubber stopper can be remarkably improved by incorporating the fluorine-containing elastomer into the composition for the body of the rubber stopper. Thus, when the cured fluorine-containing elastomer coating layer is coated on the surface of the rubber stopper which is made of chlorinated butyl rubber having excellent gas impermeability, and steam impermeability which is used on a vial bottle, the sterilization by using ethylene oxide gas can be effectively performed because of excellent heat resistance and chemical resistance of the cured coating layer, and moreover the sterilization by using a boiling water or steam can be also effectively performed because the adhesion is not lost by the hot water. The amount of the fluorine-containing elastomer incorporated in the composition for the body of the rubber stopper can be only small and usually in a range of about 1 to 50 wt. parts preferably 4 to 10 wt. parts per 100 wt. parts of the composition for the body of the rubber stopper.

The cured coating layer of the present invention has excellent surface slippage because of excellent lubricating characteristic, whereby the trouble of mutual adhesion of the rubber stoppers to prevent smooth closing operation and the adhesion of virus or impurities can be prevented. Thus, the cured coating layer coated on the surface of the rubber stopper is effective to prevent the adhesion of virus and impurities. Even though virus or impurity is adhered on the layer, the sterilization can be effectively performed without dissolution of an impurity. As the optimum embodiment, the cured coating layer can be formed without any curing accelerator. Therefore, hygiene and safety as the rubber stopper for pharmaceutical application can be satisfactorily maintained.

The fluorine-containing elastomer used in the present invention has excellent heat resistance and chemical resistance as the common characteristics of fluorinated rubbers and has the improved lubricating property. In the optimum embodiment, the curable property and the adhesive property are remarkably improved. In the case of the rubber stopper which should have excellent gas impermeability and water vapor impermeability, the special rubber such as butyl rubber, chlorinated butyl rubber, brominated butyl rubber or a mixture of chlorinated butyl rubber and polybutadiene which has such properties is used for the composition of the body of the rubber stopper. In the other cases, natural rubber and various synthetic rubbers such as butadiene rubber, nitrile rubber, styrene-butadiene rubber, chloroprene rubber, epichlorohydrin rubber, ethylene-propylene rubber and ethylene-propylene-diene rubber can be used for the composition of the body of the rubber stopper by coating the cured coating layer on the surface of the rubber stopper. Thus, the difficulty for selecting a rubber depending upon kinds of an injection contacting with the rubber stopper and resistance to the injection can be overcome. The difficulty for selection of the rubber and inconvenience can be eliminated and an erroneous use of the rubber stopper can be prevented.

The present invention is further illustrated by the following examples. It should be understood, however, that the present invention is not limited by the description.

REFERENCE 1

Fifty grams of the fluorine-containing polymeric segment of average degree of polymerization being 800 (number) which had molar ratios of $C_2F_4:C_3H_6:$glycidyl vinylether of 54:44:2, respectively, was dissolved in 500 ml. of ethyl acetate at room temperature. After complete dissolution, 50 grams of polysiloxane having an average degree of polymerization of 200 and having the formula

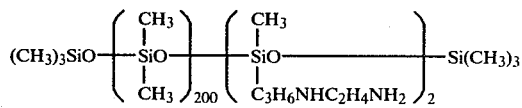

was added to react them for 16 hours at room temperature, followed by refluxing at 77° C. for further 2 hours. The solvent was then removed by a distillation and the reaction product was dried. The unreacted polysiloxane was extracted by using 100 ml. of carbon tetrachloride. The purified polymer dried in vacuum deccicator was found to be transparent elastomer having a decomposition temperature of 305° C. The polymer was found to contain 23 weight % of polysiloxane and 77 weight % of the fluorine-containing polymeric segment in a partially gelled form.

REFERENCE 2

In accordance with the process of Reference 1 except using 70 g. of polysiloxane having an average degree of polymerization of 3,000 (number) and having the formula:

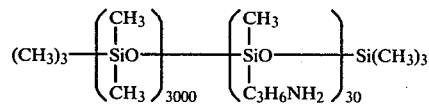

and 30 g. of polysiloxane, a reaction was carried out to obtain a graft polymer which was a transparent soft polymer which was not substantially dissolved in carbon tetrachloride in a partially gelled form.

REFERENCE 3

Seventy grams of fluorine-containing polymeric segment of low degree of polymerization, whose number average degree of polymerization being 135, and molar ratios of $C_2F_4:C_3H_6:$glycidyl vinylether being 55:42:3, respectively, was dissolved in 300 grams of $CF_2Cl-CFCl_2$ (hereinafter R-113). Thirty grams of polysiloxane having the formula

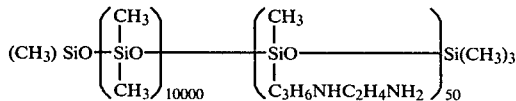

and having an average degree of polymerization of about 10,000 was dissolved in different portion of 200 grams of R-113. These solutions were mixed at room temperature and was gradually heated up to 47° C., the boiling temperature of R-113. After the reaction mixture was refluxed for 24 hours, R-113 was removed by a distillation. The graft polymer prepared was dried at 75° C. in vacuum for 5 hours to obtain a soft, transparent polymer which was not substantially extracted by carbon tetrachloride, but was soluble in tetrahydrofuran.

REFERENCE 4

Fifty grams of fluorine-containing polymeric segment having a number average degree of polymerization of 100, having a molar ratio of vinylidene fluoride: hexafluoropropylene being 70:30 was dissolved in 200 grams of methyl ethyl ketone. 50 Grams of the same polysiloxane used in Reference 3 was dissolved in another port-portion of 300 grams of methyl ethyl ketone. Both the solutions were mixed at room temperature, and the reaction mixture was then gradually heated up to the boiling point of methyl ethyl ketone and refluxed for 24 hours. After removing methyl ethyl ketone by distillation, the polymer was dried in vacuum at 120° C. for 5 hours, to obtain a transparent pale yellow polymer which was not substantially extracted by carbon tetrachloride, but was soluble in tetrahydrofuran.

REFERENCE 5

Two types of the polymers having molar ratios of $C_2F_4:C_3H_6$:glycidylvinyl ether of 56:42:2, respectively, were prepared. One of them had the average degree of polymerization of 800, and the other 2,700. Fifteen grams each of the polymers prepared was dissolved in 500 grams of R-113. 3.3 Grams of polysiloxane having the formula

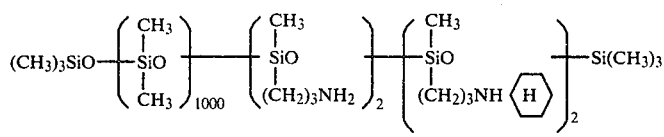

was dissolved in 15 grams of R-113, which was gradually added into the above described solution containing the fluoropolymers. The mixture was stirred for three hours at room temperature, followed by elevating the temperature up to 50° C. to evaporate R-113 during the next 1.5 hours to continue the reaction. The reaction was further continued at 80° C. for 3 hours under a reduced pressure to remove the solvent to obtain a transparent soft and homogeneous elastomer which was soluble in tetrahydrofuran.

REFERENCE 6

Fifty grams of polysiloxane latex (EP-40L, Shinetsu Kagaku K.K.) comprising a copolymer of dimethylsiloxane and methyl vinyl siloxane, 0.25 g of ammonium persulphate, 0.07 g of sodium bisulfite, 1.0 g of disodium phosphate 12 hydrate, 0.25 g of ammonium perfluorocarboxylate, 0.08 g of glycidylvinyl ether were charged into a 100 ml. autoclave, which was then degassed and the mixed gas of tetrafluoroethylene and propylene (molar ratio of 85:15) was introduced under a pressure of 23 kg/cm$^2$ at room temperature. The polymerization reaction was initiated at 50° C. After 5 hours, the temperature of the reactor was lowered to terminate the reaction. The latex was freeze-coagulated to obtain 20 grams of a polymer which was a slightly gelled soft rubber.

EXAMPLE 1

Each of the fluorine-containing elastomer obtained in Reference 2 or Reference 5 was dissolved in 1,1,2-trichlorotrifluoroethane containing a small amount of ethyl acetate to prepare each solution of the fluorine-containing elastomer having a concentration of 5 wt.%. Each rubber stopper made of butyl rubber having a flat circular top having a diameter of 20 mm for a vial bottle was dipped in the solution to form a coating layer on a whole of the surface of the rubber stopper. The coating layer was dried and heated at 150° C. for 30 minutes to prepare rubber stoppers A and B which were respectively coated with each cured coating layer having a thickness of 5μ.

As a test of slippage characteristics of the cured coating layer, the rubber stopper for the vial bottle was put in upside down on a phenol resin plate coated with a polytetrafluoroethylene coating layer. One edge of the phenol resin plate was gradually raised at a linear velocity of 8 mm/min. from the horizontal position. The angle of the plate at the time slipping down the rubber stopper A or B was measured. The angle was about 30° in both the cases, and was superior to 40° in the case of a rubber stopper coated with a silicone coating layer.

As a test of adhesive property of the coating layer in boiling water, the rubber stopper A or B was dipped in hot water at 100° C. for 3 hours. The cured coating layers of the rubber stoppers A and B were not peeled off. On the other hand, a rubber stopper made of butyl rubber which was wholly coated with a cured fluorinated rubber paint (Perflon paint: manufactured by Kinyosha) for a vial bottle was tested by the same test method. The coating layer was peeled off under the same test condition.

Various toxicities were tested by the test methods of Ministry of Health and Welfare order No. 434. The rubber stoppers A and B were satisfactory in all test items whereas the rubber stopper having a cured fluorinated rubber paint coating layer was not satisfactory in certain test items.

As a test for bacteria resistance of the cured coating layers of the rubber stoppers A and B, the tests of MIL-E-5272C using common four bacteria groups were respectively carried out. Any growth of bacteria was not found within 30 days.

As a test for weight gain by treating in hot water or steam, modified rubber stoppers A and B having each cured coating layer having a thickness of 10μ (only modified thickness of A and B) were tested. Four rubber stoppers having the cured coating layer having a weight of about 2.4 g were precisely weighed and dipped in hot water at 140° C. under higher pressure for 2 hours and dried in an atmosphere at 105° C. for 10 minutes. As a result, 0.27% of a weight gain percent was measured. This is only about 1/7 of 1.95% of a weight gain percent of the rubber stopper having no coating layer. When steam was used instead of hot water, similar result was found.

EXAMPLE 2 AND COMPARATIVE REFERENCE 1

A rubber stopper made of a mixture of 100 wt. parts of butyl rubber and 5 wt. parts of the fluorine-containing elastomer obtained in Reference 1 for avial bottle was coated with a solution of the fluorine-containing elastomer obtained in Reference 2 in 1,1,2-trichlorotrifluoroethane at a concentration of 2 wt.% by dipping to form the coating layer on the whole surface. The layer was dried and heated at 130° C. for 60 minutes to obtain a rubber stopper C coated with a cured coating layer having a thickness of 3μ. Various properties of the coated rubber stopper C were tested. As a reference, the commercially available butyl rubber stopper having no coating layer was used. The test results are shown in Table 1.

TABLE 1

|  | Standard | Rubber stopper C having coating layer (Exp. 2) | Commercially available rubber stopper having no coating layer (Comp. Ref. 1) |
|---|---|---|---|
| Extract solution*1 | >99% | 100–99.9% | 99.7% |
| UV absorption*2 | <0.2 | 0.01–0.02 | 0.01–0.02 |
| pH of extract solution*3 | <1.0 | 0.1 | 0.5 |
| Consumption of KMnO4*4 | <2.0 | 0.5 | 0.5 |
| Needle penetration pressure*5 | <800 g | 400–430 g | 410 g |
| Tackiness*6 | <50° | 29–31° | 40° |
| Number of peeled pieces*7 | <5 | 0 | 0 |
| Number of fine particles*8 | 2–3μ | 12 | 25241 |
|  | 3–5μ | 7 | 24836 |
|  | 5–7μ | 4 | 8397 |
|  | 7–10μ | 2 | 1773 |
|  | 10–20μ | 2 | 755 |

Note : Measurements
*1 to *4 Test method for rubber stopper for transfusion
*5 A rubber stopper is fitted to a vial bottle and a needle for injection is penetrated for 2 times. A weight for the penetration of the needle is measured by Autograph-IS-2000 (manufactured by Shimazu). The needle for injection is a ⅛ needle for intravenous injection. The velocity for penetration is 500 mm/min.
*6 See Example 1.
*7 A rubber stopper is fitted to a vial bottle filled with a water for injection and a needle is penetrated for 5 times. The water is filtered through a filter paper. The filter paper is dried and observed by a microscope.
*8 A rubber stopper is fitted to a vial bottle filled with water having no contamination. The bottle is shaked for 5 minutes and number of particles is measured by a fine particle tester (HIAC-Pc-320 Type).

EXAMPLES 3 to 5

Hundred grams of a fluorine-containing polymeric segment having a number average degree of polymerization of 400, having molar ratios of $C_2F_4:C_3H_6$:glycidyl vinyl ether of 54:44:2 was dissolved in 1 kg. of R-113 (1,1,2-trichlorotrifluoroethane). A solution of polysiloxane having the formula

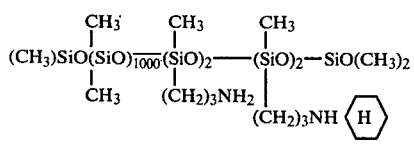

in R-113 at a concentration of 10 wt. % was added to give 3 g. of the polysiloxane (Example 3), 10 g. of the polysiloxane (Example 4) and 20 g. of the polysiloxane (Example 5) to the solution of the fluorine-containing elastomer to obtain each solution. Each solution was coated on a butyl rubber stopper and dried and cured at 150° C. for 30 minutes to obtain each rubber stopper having a coating layer having a thickness of 15μ. The lubricating property of the rubber stopper, the condition of the coating layer and the number of fine particles after boiling non-contaminated water were tested. The results are shown in Table 2.

TABLE 2

|  | Example 3 | Example 4 | Example 5 |
|---|---|---|---|
| Lubricating property*1 | 40 | 30 | 25 |
| Condition for coating layer | good | good | good |
| Fine particles*2 (less than 5μ) | 200 | 300 | 2000 |

Note:
*1 See Example 1
*2 After treating in hot water at 120° C. under higher pressure, fine particles are measured by a fine particle tester (HIAC).

EXAMPLES 6 TO 8

The solution of the fluorine-containing polymeric segment in R-113 used in Examples 3 to 5 was admixed with the following solutions to obtain three kinds of the mixed solutions. A solution of a fluorine-containing polymer of $C_2F_4$ and $C_3H_6$ (molar ratio of 55:45) having a number average degree of polymerization of 1,000 in R-113 (10 wt. %). A solution of polyorganosiloxane (A) in R-113 (10 wt. %) and a solution of polyorganosiloxane (B) in R-113 (10 wt. %).

Hundred grams of the fluorine-containing polymeric segment and 100 g. of the solution of the fluorine-containing polymer and 40 g. of the solution of the polysiloxane (A) (Example 6) or 40 g. of the solution of the polysiloxane (B) (Example 7) or a mixture of 20 g. of the solution of the polysiloxane (A) and 20 g. of the solution of the polysiloxane (B) (Example 8).

R-113 was removed from each mixed solution by a vacuum drier and then, the residue was heated at 80° C. for 1 hour to obtain a dry rubber. Each butyl rubber stopper was prepared by mixing 10 wt. parts of each rubber with 100 wt. parts of butyl rubber compound and press-molding the mixture. A needle penetration of the rubber stopper by an needle for injection was tested. The needle penetration of the rubber stopper was excellent and any contamination of impurities in water for injection was not caused by the needle penetration through the butyl rubber.

Polyorganosiloxane (A)

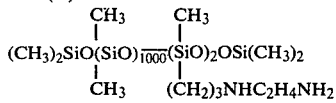

Polyorganosiloxane (B)

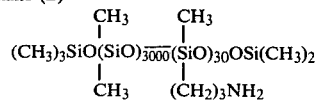

I claim:
1. A rubber stopper for sealing which comprises a rubber stopper substrate coated with a fluorine-containing elastomer comprising a graft copolymer having rubber-like elasticity comprising a fluorine-containing polymer linked to an organopolysiloxane, wherein said fluorine-containing polymer has a number average degree of polymerization in the range of 50 to 10,000 and said organopolysiloxane has a number average degree of polymerization in the range of 50 to 50,000.
2. The rubber stopper according to claim 1, wherein the fluorine-containing polymer is a terpolymer of tetrafluoroethylene, propylene, and glycidyl vinyl ether, the organopolysiloxane is a copolymer of dimethyl siloxane or methyl trifluorosiloxane and a siloxane having an amino-containing side chain, and wherein said fluorine- containing polymer is linked to said organopolysiloxane by a linking group having the formula $$-\underset{\underset{\text{OH}}{|}}{\text{CH}}\text{CH}_2\text{NRCH}_2-,$$

wherein R represents hydrogen or an alkyl group.

3. The rubber stopper according to claim 2 wherein the linking group is formed by the reaction of a side chain present in the organopolysiloxane selected from the group consisting of aminopropyl, N-aminoethylaminopropyl, and N-cyclohexylaminopropyl.

4. The rubber stopper according to claim 1 wherein the fluorine-containing polymer is formed from at least two different monomers, at least one of which is a fluorine-containing olefin.

5. The rubber stopper according to claim 1 or 2 wherein 100 parts by weight of fluorine-containing polymer are chemically grafted to 1 to 2000 parts by weight of organopolysiloxane.

6. The rubber stopper according to claim 1 wherein the rubber stopper for sealing is a rubber stopper for a pharmaceutical application.

7. The rubber stopper according to claim 6, wherein the rubber stopper is a rubber stopper for sealing a bottle containing a sterile injectable substance.

8. The rubber stopper according to claim 1 wherein a cured coating layer is formed by curing in the presence of a curing accelerator.

9. The rubber stopper according to claim 8 wherein the cured coating layer is formed by heating a fluorine-containing elastomer having glycidylvinyl ether units as curing units at a temperature from room temperature to 250° C.

10. The rubber stopper according to claim 1 wherein a fluorine-containing elastomer having glycidylvinyl ether units as curing units is heated in the absence of a curing accelerator to form a cured coating layer.

11. The rubber stopper according to claim 10 wherein the cured coating layer is formed by heating at 130° to 200° C. for curing.

* * * * *